(12) United States Patent
Ishizuka

(10) Patent No.: US 8,785,838 B2
(45) Date of Patent: Jul. 22, 2014

(54) ABSOLUTE ROTARY ENCODER

(75) Inventor: Ko Ishizuka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 13/311,840

(22) Filed: Dec. 6, 2011

(65) Prior Publication Data

US 2012/0153135 A1 Jun. 21, 2012

(30) Foreign Application Priority Data

Dec. 15, 2010 (JP) ................................. 2010-279863

(51) Int. Cl.
*G01D 5/34* (2006.01)
*H03M 1/22* (2006.01)
*H04N 7/26* (2006.01)

(52) U.S. Cl.
USPC .................. 250/231.18; 250/231.16; 341/13; 341/200

(58) Field of Classification Search
USPC ............. 250/231.13, 231.14, 231.16, 231.17, 250/233, 236, 231.18; 341/8, 11, 13, 192, 341/200
See application file for complete search history.

(56) References Cited

U.S. PATENT DOCUMENTS

| | | | |
|---|---|---|---|
| 4,945,231 A | 7/1990 | Ohya et al. | |
| 5,068,529 A | 11/1991 | Ohno et al. | |
| 5,563,408 A | 10/1996 | Matsumoto et al. | |
| 8,188,420 B2 * | 5/2012 | Lee ........................ | 250/231.13 |

FOREIGN PATENT DOCUMENTS

| | | |
|---|---|---|
| EP | 0361457 A2 | 4/1990 |
| EP | 0729013 A2 | 8/1996 |
| JP | 60089713 A | 5/1985 |
| JP | 2004-529344 A | 9/2004 |
| WO | 02/084223 A1 | 10/2002 |

OTHER PUBLICATIONS

European Search Report issued in European counterpart application No. EP11191040.2, dated May 15, 2014.

* cited by examiner

*Primary Examiner* — Georgia Y Epps
*Assistant Examiner* — Don Williams
(74) *Attorney, Agent, or Firm* — Rossi, Kimms & McDowell LLP

(57) ABSTRACT

An absolute rotary encoder comprises a scale having marks arranged at a first pitch; a first detector and a second detector including plural photoelectric conversion elements arranged at a second pitch smaller than the first pitch, and configured to detect a predetermined number of marks, the second detector disposed opposite to the first detector; and a computing device. The computing device is configured to generate a data string by quantizing a periodic signal output from the first detector, and obtains first angle data from the data string, to normalize amplitudes of the periodic signals output from the first and second detectors, to average the normalized periodic signal to obtain second angle data from a phase of the averaged periodic signal, and to combine the first and second angle data to generate data representing an absolute rotation angle.

10 Claims, 4 Drawing Sheets

ABSOLUTE ROTARY ENCODER

BACKGROUND OF THE INVENTION

1. Field of the Invention

The present invention relates to an absolute rotary encoder.

2. Description of the Related Art

An incremental rotary encoder or absolute rotary encoder is conventionally used to measure an angle. The incremental rotary encoder records slits having a predetermined period on a disk, optically or magnetically reads the relative rotational movement of the slits, and computes an absolute position by combining the read result with an origin detecting mechanism. Note that many high-resolution products each of which has a slit pitch decreased to about 80 μm and interpolates phase information within one count by dividing the information into about 10,000 portions by using an electrical divider are recently available. Also, the slits are normally not read one by one, but a plurality of slits are read by optically averaging them. This increases the accuracy because dust, flaws, defects, and pattern errors of the slits themselves are canceled. Since, however, absolute angle information cannot be obtained unless the original is initially detected, applications to particularly the fields of machine tools and robots are limited.

Various kinds of absolute encoders have been proposed as binary patterns, and a so-called gray code method of recording binary patterns on a plurality of tracks and a method of recording a random-number code on one track are available. However, the resolution of the gray code method is not so high because mounting errors make it difficult to synchronize the detection timings of pieces of information of different tracks. Accordingly, a method has been proposed by which binary codes 1 and 0 are expressed by the value of the transmittance, the value of the slit width, or the presence/absence of slits or pits arranged at equal intervals, and recorded as cyclic code patterns on one track. The cyclic code patterns are patterns in which when 1s and 0 s are arranged at random, there are absolutely no portions having the same arrangement on the entire circumference in M adjacent patterns. Japanese Patent Laid-Open No. 60-89713 has disclosed an absolute encoder using an M-sequence code as a kind of the cyclic code.

Japanese Patent Laid-Open No. 2004-529344 has disclosed an absolute encoder using an absolute code obtained by partially removing reflective slits periodically arranged at equal intervals.

When applying the above-described absolute encoder to a rotary encoder, the measurement accuracy decreases if a difference (eccentricity) is produced between the rotational center of a disk and the center of a large number of radially arranged slits. The incremental encoder has conventionally widely used a method by which two detectors are arranged to oppose each other with respect to one disk, and the decrease in accuracy caused by the eccentricity of the disk is canceled by averaging the measurement values of angles. This is so because if the eccentricity amount is much smaller than the pitch of the radially arranged slits, the phases of sine-wave signals from the two detectors can be averaged by a simple method of directly adding the sine waves.

For the absolute rotary encoder, however, no simple method of averaging signals from two detectors has been proposed because the detection of codes and the processing of high-resolution signals are complicated. Furthermore, in a built-in type (module type) rotary encoder, signals deteriorate due to a positional error between a disk and detection head, so it is also necessary to prevent the decrease in accuracy caused by deterioration like this. Under the circumstance, no opposite arrangement type absolute rotary encoder has been implemented.

As described above, earnest demands have arisen for implementing an absolute rotary encoder capable of canceling the influence of the eccentricity of a disk and having both a high accuracy and high resolution. Especially in a so-called module type encoder in which a disk and detection head are separated, the eccentricity of the disk readily occurs. Therefore, an absolute rotary encoder capable of maintaining a high accuracy even if a mounting error such as eccentricity occurs has been desired.

SUMMARY OF THE INVENTION

The present invention provides, for example, an absolute rotary encoder advantageous in precision.

The present invention in its first aspect provides an absolute rotary encoder comprising: a scale having a plurality of marks corresponding to an absolute code are arranged at a first pitch in a circumferential direction, and configured to be rotated around a rotation axis; a first detector including a plurality of photoelectric conversion elements arranged at a second pitch smaller than the first pitch, and configured to detect a predetermined number of marks corresponding to the absolute code by the plurality of photoelectric conversion elements; a second detector disposed opposite to the first detector with respect to the rotation axis, including a plurality of photoelectric conversion elements arranged at the second pitch, and configured to detect the predetermined number of marks corresponding to the absolute code by the plurality of photoelectric conversion elements; and a computing device configured to compute an absolute rotation angle of the scale based on respective outputs from the first detector and the second detector, wherein the computing device is configured: to generate a data string including the predetermined number of data by quantizing a periodic signal output from the first detector and having the predetermined number of periods, and to obtain first angle data corresponding to the absolute code from the data string, to normalize amplitudes of the periodic signals respectively output from the first detector and the second detector, to average the normalized periodic signal output from the first detector and the normalized periodic signal output from the second detector, and to obtain second angle data from a phase of the averaged periodic signal, and to combine the first angle data and the second angle data to generate data representing the absolute rotation angle.

Further features of the present invention will become apparent from the following description of exemplary embodiments with reference to the attached drawings.

DESCRIPTION OF THE EMBODIMENTS

First Embodiment

Figure 1:
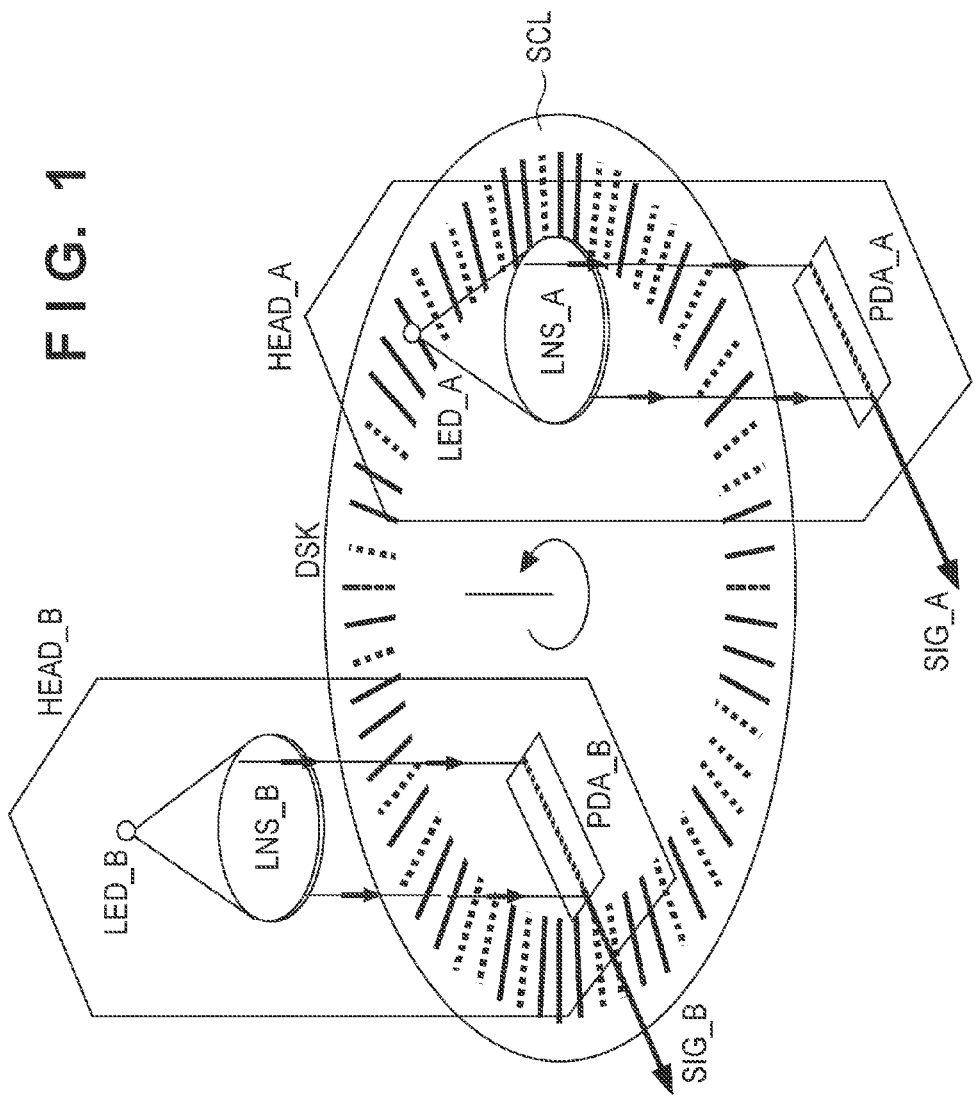
FIG. 1 is a perspective view of a transmissive slit type absolute rotary encoder of the first embodiment.
Figure 2:
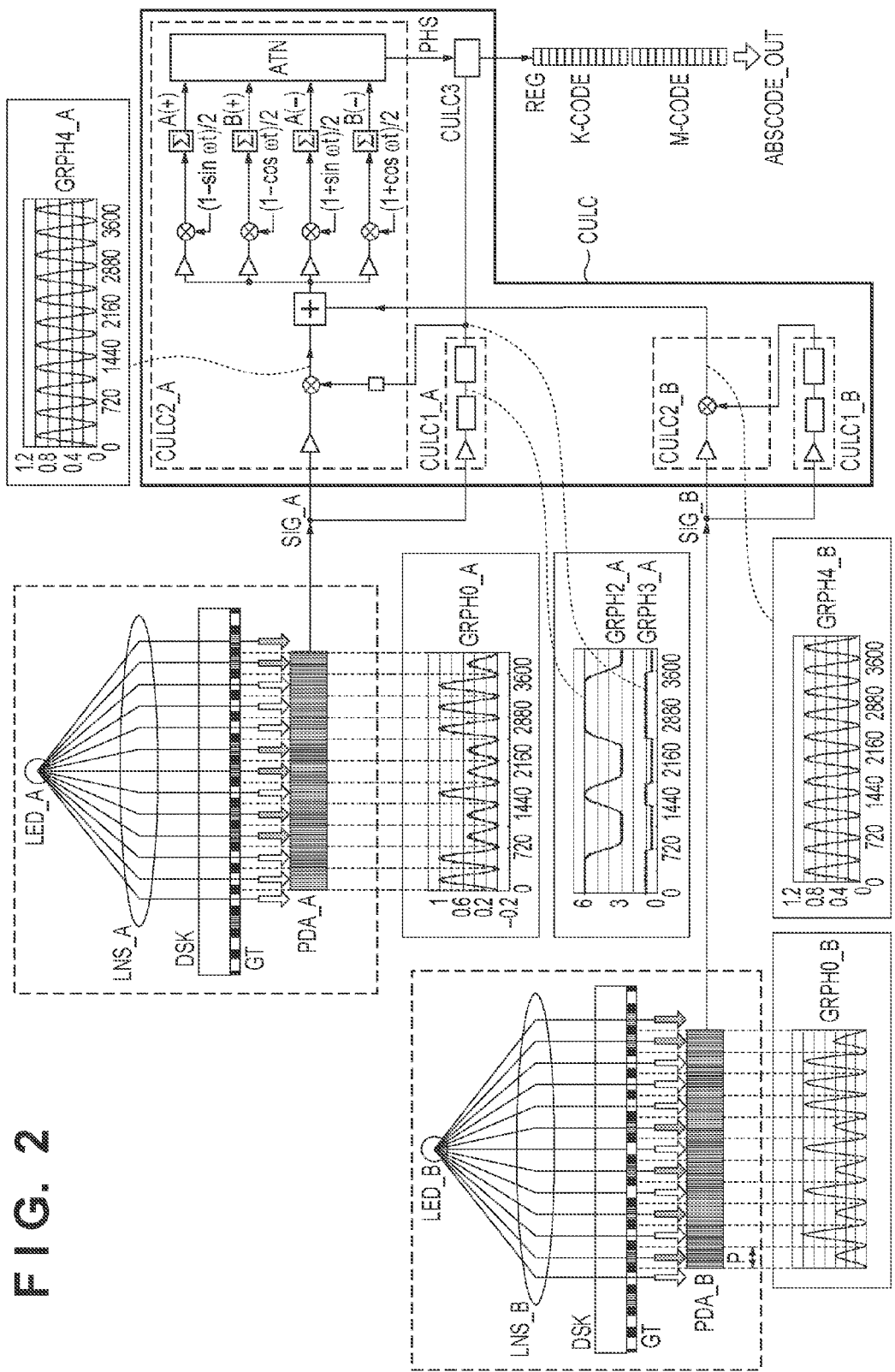
FIG. 2 is a view for explaining the processing of a computing device of the transmissive slit type absolute rotary encoder of the first embodiment.

An absolute rotary encoder of the first embodiment will be explained below with reference to FIGS. 1 and 2. FIG. 1 is a view for explaining the arrangement of a transmissive slit type absolute rotary encoder. FIG. 2 is a view for explaining the procedure of signal processing performed by a computing device CULC. The absolute rotary encoder of the first embodiment detects the absolute rotation angle of a scale SCL formed on a disk DSK that rotates around a rotation axis.

As shown in FIG. 1, two detection heads HEAD_A and HEAD_B are almost symmetrically arranged with respect to the rotation axis (a second axis) of the disk DSK. Collimator lenses LNS_A and LNS_B convert diverging light beams emitted from point light sources LED_A and LED_B into parallel light beams. The parallel light beams illuminate the scale SCL of the disk DSK which relatively rotationally moves and in which an M-bit absolute code having slits GT is embedded.

In the scale SCL, non-transmissive slits are first radially arranged at equal angles around the central axis of the disk DSK, and transmissive slits or partially transmissive slits are arranged between them. It is of course also possible to radially arrange transmissive slits at equal angles and arrange non-transmissive slits or partially transmissive slits between them. The partially transmissive slits can be implemented by forming thin partially transmissive films on the transmissive slits, reducing the size of the transmissive slits, or partially shielding the transmissive slits by using hatching patterns or the like, and any method can be used as long as the transmitted light amount can be reduced. FIG. 1 schematically shows the partially transmissive slits by dotted lines.

The two types of slits, that is, the partially transmissive slits and transmissive slits form two types of marks at a predetermined period, and a plurality of the two types of slits are arranged, thereby forming the scale SCL forming the M-bit absolute code. In the first embodiment, the two types of marks have the same shape and different transmittances, and each of the two types of marks has a uniform transmittance in the mark. In the first embodiment, the number M of bits of the absolute code is M=11.

First and second detectors (light receiving element arrays) PDA_A and PDA_B receive light transmitted through the marks formed by the partially transmissive slits and transmissive slits of the disk DSK. The explanation will be made with reference to FIG. 2 in which the detection heads HEAD_A and HEAD_B are exemplarily vertically arranged. Each of the light receiving element arrays PDA_A and PDA_B detects a string of a predetermined number of (eleven) marks by a plurality of photoelectric conversion elements arranged along the mark arranging direction at a second pitch smaller than the mark pitch (a first pitch). The light receiving element arrays PDA_A and PDA_B are arranged such that N photoelectric conversion elements correspond to one mark, and the output phases from these photoelectric conversion elements are shifted from each other at equal intervals. In the first embodiment, the number N of divisions of one mark signal is N=12, and the number of channels of the light receiving element arrays PDA_A and PDA_B is N×M=132. In this manner, periodic signals SIG_A and SIG_B having eleven periods can always be obtained by the 132 channels of the light receiving element arrays PDA_A and PDA_B.

The absolute code can be an M-sequence code in which a light transmissive portion is 1 and a partially light transmissive portion is 0, or another cyclic code generated by a primitive polynomial. The M-sequence code is a kind of a cyclic code pattern in which a plurality of adjacent patterns formed by arranging 1s and 0s at random have no portions having the same arrangement, and is a pattern having the longest period. GRPH0_A and GRPH0_B indicate the bright-and-dark distributions of incident light to the light receiving element arrays PDA_A and PDA_B. The elements of the light receiving element arrays PDA_A and PDA_B output a plurality of electrical signals corresponding to the brightness and darkness, and the plurality of electrical signals output from the light receiving element arrays PDA_A and PDA_B are temporarily stored in a register REG. The electrical signals are serially transferred by using an externally applied clock signal as a trigger. Serially transferred signal waveforms GRPH1_A and GRPH1_B (not shown) are the same as GRPH0_A and GRPH0_B indicating the incident light amount distributions. The serially transferred signal waveforms GRPH1_A and GRPH1_B are each shown as a sine waveform whose amplitude is modulated by the absolute code. However, the actual waveform becomes a triangular wave or trapezoidal wave due to the fluctuations in spacings between the disk DSK and light receiving element arrays PDA_A and PDA_B, that is, the sine wave is distorted. The two output waveforms from the light receiving element arrays PDA_A and PDA_B will be handled as "waveform data" corresponding to the number of channels N×M=132 of the light receiving element arrays, and computing devices CULC_A and CULL_B to be described below convert "waveform data" one after another.

The computing devices CULL_A and CULL_B compute the absolute positions of the disk DSK with respect to the light receiving element arrays PDA_A and PDA_B based on the serially transferred waveforms GRPH1_A and GRPH1_B output from the light receiving element arrays PDA_A and PDA_B. First computing units CULC1_A and CULC1_B and second computing units CULC2_A and CULC2_B of the computing devices CULL_A and CULL_B process the serially transferred waveforms GPRH1_A and GRPH1_B. The first computing unit CULC1_A generates a data string including twelve data by quantizing the amplitudes of twelve periodic signals output from the light receiving element array PDA_A, and converts this data string into first angle data having the above-mentioned period as a minimum unit. That is, the first computing unit CULC1_A first computes a total sum signal of the outputs from the central photoelectric conversion element and a predetermined number of (five) nearby (adjacent) photoelectric conversion elements, and converts the serially transferred waveform GRPH1_A into a waveform GRPH2_A.

Furthermore, the first computing unit CULC1_A quantizes (binarizes) the computed total sum signal by comparing it with a reference value (intermediate intensity), thereby converting the waveform GRPH2_A into a digital signal waveform GRPH3_A. The waveform GRPH3_A is a first temporary absolute code (integer part). The first computing unit CULC1_A converts the first temporary absolute code into first angle data whose unit is the mark period. The second computing unit CULC2_A multiplies the serially transferred waveform GRPH1_A from the light receiving element array PDA_A by 1 when the first temporary absolute value output from the first computing unit CULC1_A is 1, and by 2 when the first temporary absolute value is 0. Thus, the second computing unit CULC2_A generates a periodic signal WAV_A whose amplitude is normalized by removing the influence of amplitude modulation of the absolute code, as indicated by GRPH4_A.

Like the first computing unit CULC1_A, the first computing unit CULC1_B converts the serially transferred waveform GRPH1_B into a waveform GRPH2_B (not shown), and further converts the waveform GRPH2_B into a digital signal waveform GRPH3_B (not shown). The waveform GRPH3_B is a second temporary absolute code (integer part). The second computing unit CULC2_B multiplies the serially transferred waveform GRPH1_B from the light receiving element array PDA_B by 1 when the second temporary absolute value output from the first computing unit CULC1_B is 1, and by 2 when the second temporary absolute value is 0. Thus, the second computing unit CULC2_B generates a periodic signal WAV_B whose amplitude is normalized by removing the influence of amplitude modulation of the absolute code, as indicated by GRPH4_B.

The second computing unit CULC2_A adds the two periodic signals WAV_A and WAV_B, and generates an average periodic signal WAV_AB. The second computing unit CULC2_A divides the generated average periodic signal WAV_AB into four signals, and multiplies the four signals by $\{(1-\sin \omega t)/2\}$, $\{(1-\cos \omega t)/2\}$, $\{(1+\sin \omega t)/2\}$, and $\{(1+\cos \omega t)/2\}$. The second computing unit CULC2_A calculates the total sum of these elements, thereby generating four-phase signals (voltages) A(+), B(+), A(−), and B(−) having a phase difference of 90° in a so-called incremental encoder. The phases of the periodic signals WAV_A and WAV_B match when the two detection heads HEAD_A and HEAD_B are ideally symmetrically arranged with respect to the rotation axis of the disk DSK. If an arrangement error or the eccentricity of the disk DSK exists, however, a phase difference is produced between the two periodic signals WAV_A and WAV_B. When this phase difference becomes 180°, the amplitude of the addition signal WAV_AB disappears. In order to obtain a sufficient amplitude of the addition signal, therefore, the positions of the detection heads must be corrected so as to sufficiently decrease the phase difference.

Assuming that the detection head HEAD_A is a measurement reference, let PT2 be the pitch (length) of radial slits being detected by the detection head HEAD_B, and e be a supposed maximum eccentricity amount of the disk. Under the conditions, a position where the detection head HEAD_B is to be placed with respect to a generally ideal opposite position (a position of 180°) falls within the range of a place where the phase difference is zero±(PT2/4−e). For example, when PT2=80 μm and e=5 μm, the ideal opposite position falls within the range of a place where the phase difference is 0±15 μm. A plurality of positions where the phase difference is zero exist near the opposite position of 180° for each period PT2, and any position can be used. These conditions are the same as the required conditions described in "Description of the Related Art", by which two detectors are arranged to oppose each other with respect to one disk in an incremental encoder, and the decrease in accuracy caused by the eccentricity of the disk is canceled by averaging angle measurement values.

In addition, the second computing unit CULC2_A performs an arctangent operation ATN (or looks up a table by division) by using a difference signal between the sine multiplication signal total sums A(+) and A(−) and a difference signal between the cosine multiplication signal total sums B(+) and B(−). Thus, the second computing unit CULC2_A can compute a phase PHS of a periodic signal having a resolution equal to that of a so-called incremental encoder. Note that ωt is equivalent to a phase in which the serially transferred waveform moves by one bright-and-dark period. The periodicity of the original periodic signal of this phase information is guaranteed, and the amplitude of the signal is normalized. Therefore, even when the sine waveforms output from the light receiving element arrays PDA_A and PDA_B contain distortion, the phase information is unaffected by the distortion in principle because division is performed using the total sum signals. Accordingly, the phase information computed by the second computing unit CULC2_A has a very high accuracy and is highly divisible; the information can normally be divided into 1,000 or more portions. From at least one phase information of the twelve periodic signals having the normalized amplitude, the second computing unit CULC2_A computes second angle data having the resolution of the length of a segment obtained by dividing the mark period, and having a minimum unit smaller than that of the first angle data.

The third computing unit CULC3 combines the first angle data converted by one of the first computing units CULC1_A and CULC1_B and the second angle data computed by the second computing unit CULC2_A, thereby generating data representing the absolute rotation angle of the disk DSK. The third computing unit CULC3 stores, in the register REG, the generated data representing the absolute rotation angle of the disk DSK as a final code of the absolute encoder. This data stored in the register REG is serially output as needed. The number of elements of the signals (the upper waveforms of GRPH2_A and GRPH2_B) generated based on the light receiving element arrays PDA_A and PDA_B is the number of signals N×M=132 equivalent to the channels of the light receiving element arrays PDA_A and PDA_B. Accordingly, an M-bit integer part absolute code is obtained by extracting and arranging, for every N=12, signals generated based on the light receiving element arrays PDA_A and PDA_B.

The M-bit absolute code can directly be output as a cyclic code, and can also be output after being converted into a normal binary code. Also, the M-bit absolute code must normally undergo a process of synchronizing the switching timings by using the value of the phase information PHS. For example, to generate an absolute code equivalent to an interpolation part based on the phase information PHS (a portion below the decimal point), a phase value computed by an operation is quantized by K bits, and the quantized value is converted into a K-bit binary code. An absolute encoder is implemented by outputting a serial signal generated by directly connecting, as the upper and lower portions, an M-bit integer part absolute code M-CODE and K-bit interpolation part absolute code K-CODE obtained as described above.

The encoder constituted as described above computes phase information by averaging N sets of periodic signals from N marks in each of two portions symmetrical with respect to the rotation axis of the disk DSK. Accordingly, the value of phase information interpolated by an arctangent operation has accuracy higher than that of the conventional incremental encoder. In this embodiment, the absolute code switching portion also uses the phase information calculated by averaging N sets of periodic signals. Since, therefore, the absolute code switching portion is defined without any influence of a partial mark edge drawing error, the absolute code integer part also has a very high accuracy. This makes it possible to implement a high-resolution absolute encoder capable of maintaining a high accuracy of a finally output absolute code even when a disk has eccentricity.

Second Embodiment

Figure 3:
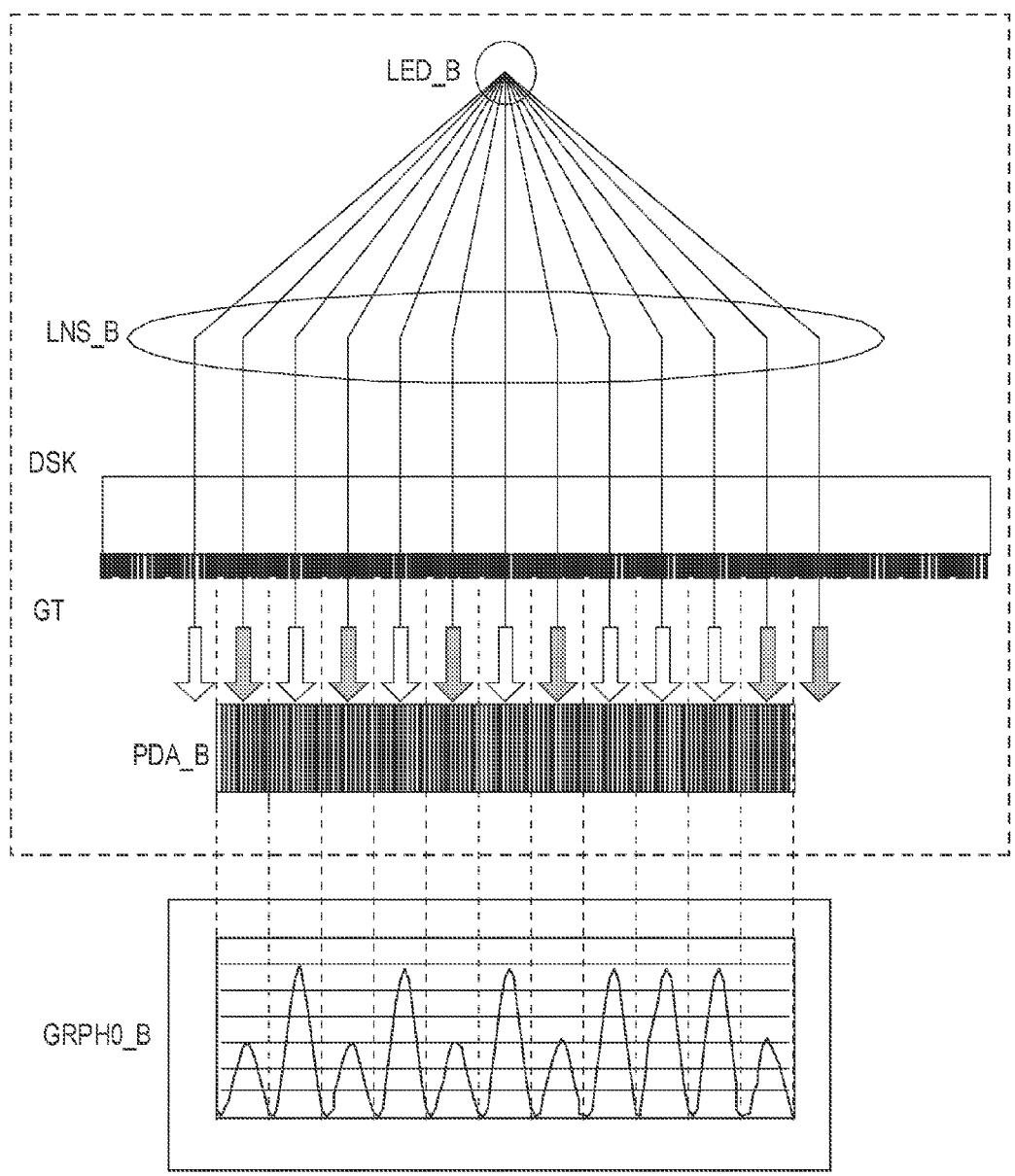
FIG. 3 is a view for explaining first and second detectors of a transmissive slit type absolute rotary encoder of the second embodiment.

FIG. 3 shows an absolute rotary encoder of the second embodiment. In the first embodiment, the transmissive slits and partially transmissive slits as the two types of marks each have a uniform transmittance within the mark. In the second embodiment, two types of marks each have a transmittance that changes in accordance with a position in the mark. That is, the second embodiment uses patterns formed such that the transmission density continuously changes, and a pattern having a large transmittance peak value and a pattern having a small transmittance peak value are recorded so as to correspond to binary codes 1 and 0. Note that examples of the method of continuously changing the transmission density as described above are a method using the change in configuration of a thin film, a method of continuously changing a transmitted light amount by, for example, using a curved shape instead of a straight shape as a boundary portion, and a method of adding a light shielding member using hatching.

Third Embodiment

Figure 4:
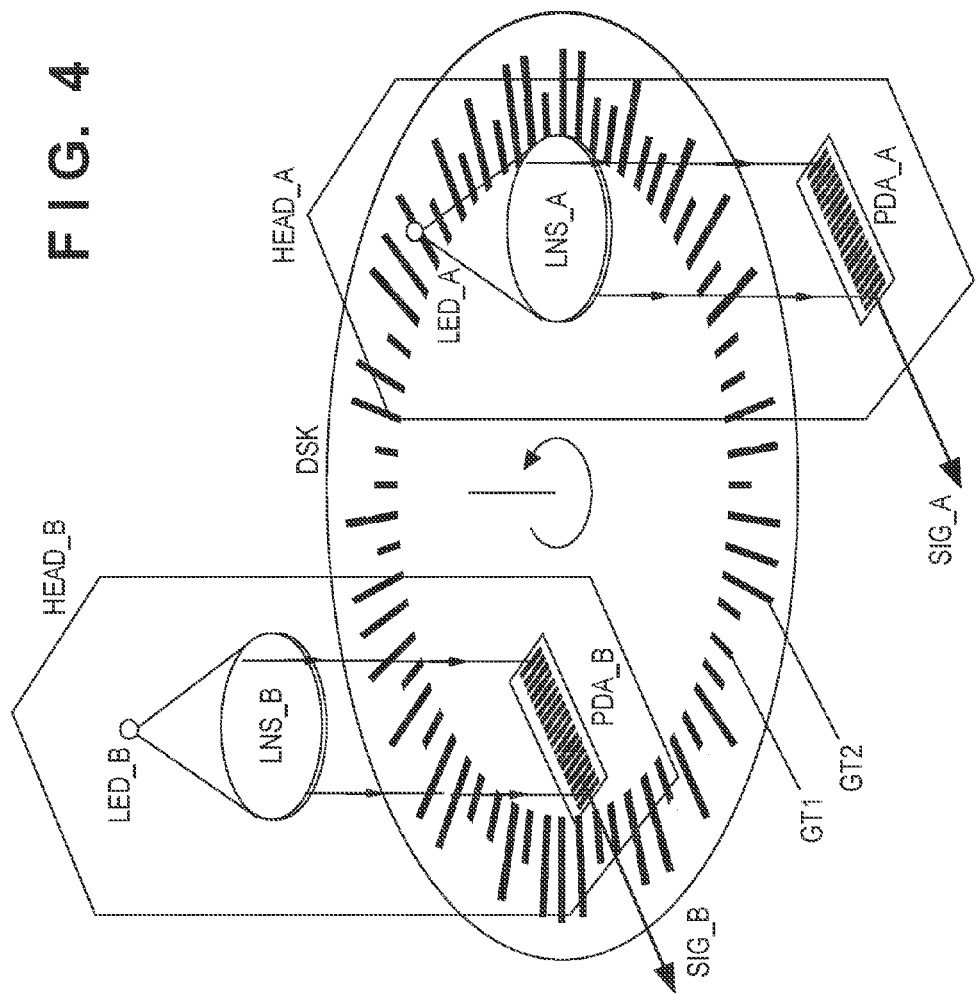
FIG. 4 is a perspective view of a transmissive slit type absolute rotary encoder of the third embodiment.

FIG. 4 shows an absolute rotary encoder of the third embodiment. In the first and second embodiments, marks having the same shape and different transmittances are used as the two types of marks. The third embodiment uses two types of marks having the same transmittance but having different lengths in a direction (second direction) perpendicular to a mark direction (first direction). Long transmissive slits GT2 and short transmissive slits GT1 are recorded on a disk DSK so as to correspond to binary codes 1 and 0. Detection heads HEAD_A and HEAD_B are arranged with respect to the rotation axis of the disk DSK. In the detection head HEAD_A, a collimator lens LNS_A converts a diverging light beam emitted from a point light source LED_A into parallel light, and illuminates the transmissive slits GT1 and GT2 on the relatively rotationally moving disk DSK with this parallel light, and a light receiving element array PDA_A receives the transmitted light. In the detection head HEAD_B, a collimator lens LNS_B converts a diverging light beam emitted from a point light source LED_B into parallel light, and illuminates the transmissive slits GT1 and GT2 on the relatively rotationally moving disk DSK with this parallel light, and a light receiving element array PDA_B receives the transmitted light.

Other Embodiments

The present invention is not limited to the constitution of the first embodiment, and various modifications and changes can be made without departing from the spirit and scope of the invention. In the first embodiment, the non-transmissive slits are arranged at equal intervals, and the transmissive slits or partially transmissive slits are arranged between them, thereby using the transmissive slits and partially transmissive slits as marks forming an absolute code. However, it is also possible to arrange totally transmissive slits at equal intervals, and arrange non-transmissive slits or partially transmissive slits between them, thereby using the non-transmissive slits and partially transmissive slits as marks forming an absolute code. The light amount distributions in this case are the vertical inversions of the waveforms GRPH0_A and GRPH0_B, so the binarization processor and the like need only be changed accordingly.

It is also possible to use a cyclic code in which the transmitted light amount and reflected light amount do not have two values of 100% and 50% but have other values (for example, 100% and 70%), or have three or more values (for example, four values of 100%, 75%, 50%, and 25%). In this case, information having two or more bits can be embedded per slit. When detecting one bright-and-dark period by twelve elements as in the first embodiment, a light projected pattern on the light receiving element array sometimes has no sine waveform due to the variation in spacing between the light receiving element arrays PDA_A and PDA_B. When information having two or more bits can be embedded per slit, however, harmonic distortion components of third and higher orders can effectively be removed, so the phase can be calculated with high accuracy. Note that one bright-and-dark period can also be changed to, for example, three, four, six, or eight elements by taking account of the necessary accuracy or the availability of the light receiving element arrays PDA_A and PDA_B.

In the first to third embodiments, the light receiving element arrays PDA_A and PDA_B detect mark strings by light transmitted through a plurality of marks. However, the light receiving element arrays PDA_A and PDA_B may also detect mark strings by receiving light reflected by marks. In this case, a plurality of marks can include at least two types of marks having the same shape and different reflectances, or at least two types of marks having the same reflectance and different shapes.

The light receiving element arrays PDA_A and PDA_B can include photoelectric conversion elements larger in number than the bits of an absolute code, and perform computation by receiving signals. In this case, a so-called "incremental encoder slit averaging effect" of a periodic signal increases, and the accuracy further increases. It is also possible to apply a method of reducing the influence of a partial read error by appropriate signal processing (a method of increasing the redundancy). The expressions or values used in the computation of the first embodiment can also be changed as needed by taking account of the variations in sensitivity of the photoelectric conversion elements of the light receiving element arrays PDA_A and PDA_B, or the variations in light amount caused by an optical system. Furthermore, an approximate value may be applied in accordance with the required accuracy.

The computing device for performing the signal processing shown in FIG. 2 may implement a similar function by using another algorithm or procedure. Examples are a method of performing addition, subtraction, and multiplication on signals from the light receiving element arrays by using a parallel analog circuit, a method of performing addition, subtraction, and multiplication or a filtering process by using a serial analog circuit, and a method of immediately performing AD conversion on signals from the light receiving element arrays and performing computation on the obtained digital information by FPGA or the like. The first embodiment uses the encoder optical system that directly transmits a parallel light beam. However, the detection method can also be performed by using an enlarging illuminating optical system using a diverging light beam, an imaging optical system using a lens, or another optical system.

It is also possible to use a constitution in which the scale of a rotary encoder is recorded as linear slits arranged at equal intervals along the circumferential direction on the cylindrical surface of a cylindrical member, and the two detection heads HEAD_A and HEAD_B are arranged close to the cylindrical surface.

The following effects are obtained by the absolute rotary encoder of the present invention.

Since the absolute rotary encoder has a function of canceling a measurement error caused by the eccentricity of a disk, the detection results from the two detection heads opposing each other can simply be averaged even when the eccentricity of the disk occurs. Therefore, accurate measurement results are obtained.

Information output from the light receiving element array has absolute code information as amplitude modulation and also has period (phase) information, and an absolute code is computed based on these pieces of information. Accordingly, accurate measurement results are stably obtained even when the light amount distribution projected on the light receiving element array fluctuates due to a mounting error between the disk and detection head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-279863 filed Dec. 15, 2010, which is hereby incorporated by reference herein in its entirety.

What is claimed is:

1. An absolute rotary encoder comprising:
a scale having a plurality of marks, including a plurality of types of marks, arranged with a space therebetween and with a period in a circumferential direction, and configured to be rotated around a rotation axis;
a first detector including a first plurality of elements, and configured to detect marks of the plurality of marks by the first plurality of elements;
a second detector disposed opposite to the first detector with respect to the rotation axis, including a second plurality of elements, and configured to detect marks of the plurality of marks by the second plurality of elements; and
a signal processor configured to obtain an absolute rotation angle of the scale based on periodic signals with a plurality of periods output from each of the first detector and the second detector,
wherein the signal processor is configured:
to generate a data string by quantizing an amplitude of the periodic signals output from the first detector with respect to each of the plurality of periods, and to obtain first angle data, with a resolution of the period, based on the data string,
to normalize the periodic signals, with respect to at least one of the plurality of periods, output from each of the first detector and the second detector, to average the normalized periodic signals obtained with respect to the first detector and the normalized periodic obtained with respect to the second detector, and to obtain second angle data, with a resolution higher than that of the first angle data, based on a phase of the averaged normalized periodic signals, and
to generate data representing the absolute rotation angle based on the first angle data and the second angle data.

2. The encoder according to claim 1, wherein the plurality of marks include at least two types of marks having the same shape and different transmittances, and the encoder is configured so that each of the first and second plurality of elements detects light transmitted through marks of the plurality of marks.

3. The encoder according to claim 2, wherein each of the at least two types of marks has a uniform transmittance.

4. The encoder according to claim 2, wherein each of the at least two types of marks has a transmittance which changes in accordance with a position therein.

5. The encoder according to claim 1, wherein the plurality of marks include at least two types of marks having the same shape and different reflectance, and the encoder is configured so that each of the first and second plurality of elements detects light reflected by marks of the plurality of marks.

6. The encoder according to claim 1, wherein the plurality of marks include at least two types of marks having the same transmittance and different lengths in a direction perpendicular to the circumferential direction, and the encoder is configured so that each of the first and second plurality of elements detects light transmitted through marks of the plurality of marks.

7. The encoder according to claim 1, wherein the plurality of marks include at least two types of marks having the same reflectance and different lengths in a direction perpendicular to the circumferential direction, and the encoder is configured so that each of the first and second plurality of elements detects light reflected by marks of the plurality of marks.

8. The encoder according to claim 1, wherein the signal processor is configured to obtain, with respect to each of the first plurality of elements of the first detector, a total sum of an output from it and outputs from a predetermined number of elements neighboring it, and to quantize the amplitude by comparing the obtained total sum with a reference value.

9. The encoder according to claim 1, wherein the plurality of marks are formed radially on a disk configured to be rotated around the rotation axis.

10. The encoder according to claim 1, wherein the plurality of marks are formed on a cylindrical surface configured to be rotated around the rotation axis.

* * * * *